(12) United States Patent  (10) Patent No.: US 8,718,841 B2
Cherepinsky  (45) Date of Patent: May 6, 2014

(54) METHOD AND SYSTEM FOR PROVIDING SIDESLIP ENVELOPE PROTECTION

(75) Inventor: Igor Cherepinsky, Sandy Hook, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 117 days.

(21) Appl. No.: 13/372,863

(22) Filed: Feb. 14, 2012

(65) Prior Publication Data

US 2013/0211634 A1     Aug. 15, 2013

(51) Int. Cl.
*G06F 7/70* (2006.01)
*G06F 19/00* (2011.01)
*G06G 7/00* (2006.01)
*G06G 7/76* (2006.01)

(52) U.S. Cl.
USPC .......................... 701/14; 701/1; 701/4; 701/8

(58) Field of Classification Search
USPC ............... 701/1, 3, 4, 5, 6, 7, 8, 9, 10, 11, 14; 244/17.11, 17.13, 75.1, 194, 195, 76 R
See application file for complete search history.

(56) References Cited

U.S. PATENT DOCUMENTS

| | | | |
|---|---|---|---|
| 4,094,479 A * | 6/1978 | Kennedy, Jr. | 244/179 |
| 4,206,891 A | 6/1980 | Perez et al. | |
| 4,814,764 A | 3/1989 | Middleton | |
| 5,213,282 A | 5/1993 | Gold et al. | |
| 5,238,203 A | 8/1993 | Skonieczny et al. | |
| 5,553,817 A | 9/1996 | Gold et al. | |
| 5,738,310 A | 4/1998 | Rollet et al. | |
| H2206 H | 12/2007 | Milgram | |
| 7,437,223 B2 | 10/2008 | Randazzo et al. | |
| 7,931,231 B2 | 4/2011 | Cherepinsky et al. | |
| 2009/0012658 A1 | 1/2009 | Cherepinsky et al. | |
| 2011/0046823 A1* | 2/2011 | Ezerzere et al. | 701/4 |

* cited by examiner

*Primary Examiner* — Rami Khatib
(74) *Attorney, Agent, or Firm* — Cantor Colburn LLP

(57) ABSTRACT

A system for providing sideslip envelope protection includes a processor for obtaining values of a sideslip envelope indicative of operating conditions of the aircraft along an axis and for estimating a sideslip angle along the axis from at least one operating condition; and a comparer for comparing the sideslip angle with the sideslip envelope to generate an output value, where the processor determines a maximum yaw rate from the output value and scales the maximum yaw rate to generate a scaled yaw rate.

16 Claims, 3 Drawing Sheets

METHOD AND SYSTEM FOR PROVIDING SIDESLIP ENVELOPE PROTECTION

STATEMENT REGARDING FEDERALLY SPONSORED RESEARCH OR DEVELOPMENT

This invention was made with Government support under W58RGZ-06-D-0045 awarded by the Department of the Army. The Government has certain rights in this invention.

FIELD OF INVENTION

The subject matter disclosed herein relates generally to the field of sideslip envelope protection in a vehicle, and more particularly, to a method and a system for estimating sideslip in the vehicle utilizing a fly-by-wire system and providing a sideslip angle limitation to an operator of a vehicle.

DESCRIPTION OF RELATED ART

Many vehicles, including helicopters, use fly-by-wire (FBW) systems to control vehicle operation. Emerging FBW helicopters provide high levels of augmentation. These systems greatly reduce pilot workload and enhance safety. Part of the safety enhancements includes control inputs that allow pilots to aggressively maneuver within the airframe structural limits and not exceed these limits. With these systems, it is possible for the flight control system to provide a variety of tactile cues (such as power cues, level flight cues, control limit cues, etc.) to the pilot. Typically, pilots are responsible for operating the helicopter within prescribed sideslip angle limits. But, there are no direct indications of sideslip angles present in these helicopters for providing guidance, and these pilots have to utilize other indicators to estimate sideslip angle. For example, the trim indicator has traditionally been used in the helicopter for estimating the sideslip angle. Improvements in providing an estimation of sideslip angle and limiting the yaw rate based on a sideslip envelope would be well received in the art.

BRIEF SUMMARY

According to one aspect of the invention, a method for providing sideslip envelope protection to an aircraft includes obtaining values of a sideslip envelope indicative of operating conditions of the aircraft along an axis; estimating a sideslip angle along the axis from at least one of the operating conditions; comparing the sideslip angle with the sideslip envelope to generate an output value; determining a maximum yaw rate from the output value; and scaling the maximum yaw rate to generate a scaled yaw rate.

According to another aspect of the invention, a system for providing sideslip envelope protection includes a processor for obtaining values of a sideslip envelope indicative of operating conditions of the aircraft along an axis and for estimating a sideslip angle along the axis from at least one of the operating conditions; and a comparer for comparing the sideslip angle with the sideslip envelope to generate an output value; where the processor determines a maximum yaw rate from the output value; and where the processor scales the maximum yaw rate to generate a scaled yaw rate.

Other aspects, features, and techniques of the invention will become more apparent from the following description taken in conjunction with the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

Embodiments of a fly-by-wire flight control system including a model following control system having an algorithm for scaling pilot inputs based on the sideslip envelope that is predetermined based on the particular airframe of an aircraft with exemplary embodiments being discussed below in detail. In an embodiment, the system includes estimating the sideslip angle by utilizing several aircraft parameters without the use of any additional sideslip sensors for determining the sideslip angle. Further, the system compares the sideslip envelope with an estimation of the sideslip angle in order to limit the maximum yaw rate available to the system. The max yaw rate is scaled based on the available sideslip envelope remaining and yaw rate control is provided as a yaw pedal displacement command in order to produce the desired aircraft response.

Figure 1:
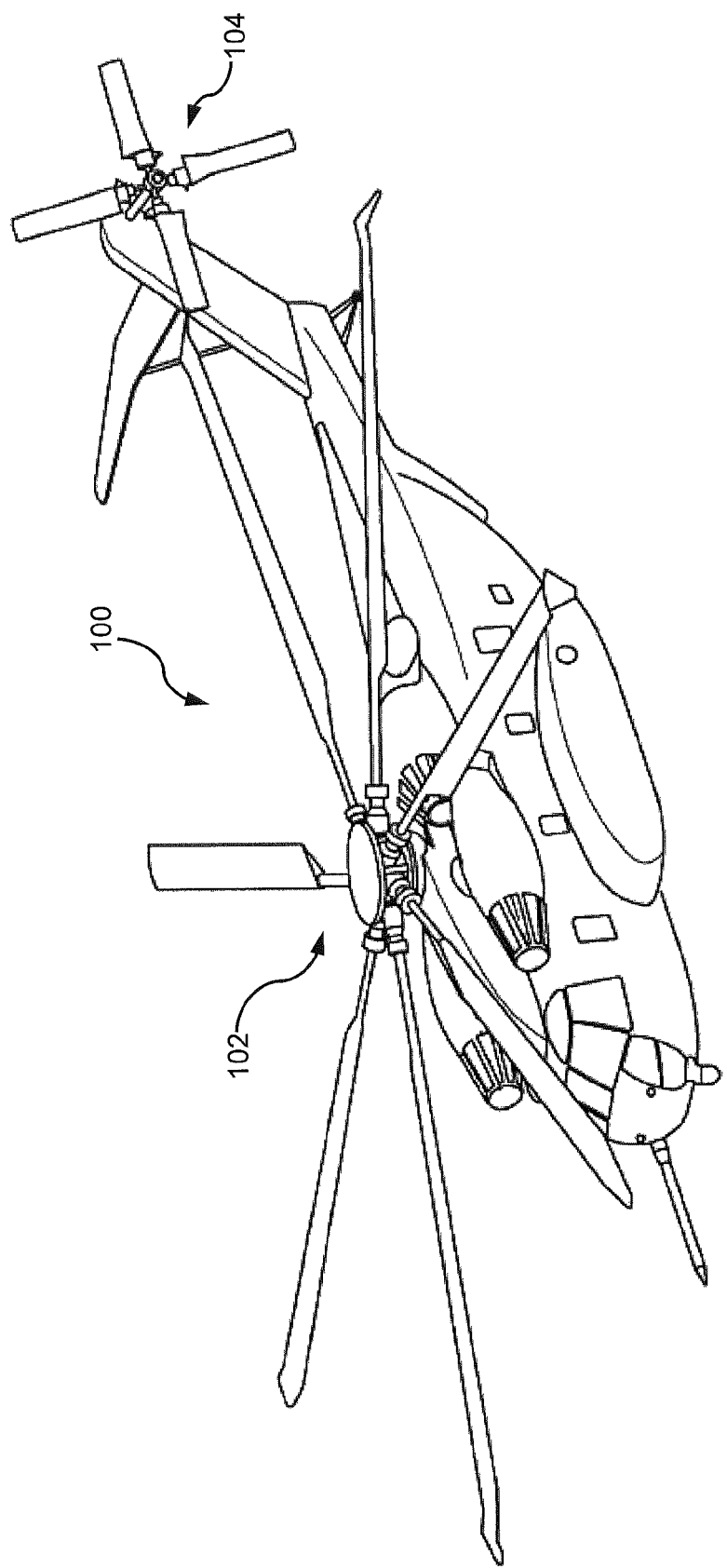
FIG. 1 is a perspective view of an exemplary rotary wing aircraft for use with embodiments of the invention.

Referring now to the drawings, FIG. 1 illustrates a general perspective view of an exemplary vehicle in the form of a vertical takeoff and landing (VTOL) rotary-wing aircraft 100 for use with embodiments of the invention. The rotary-wing aircraft 10 includes a main rotor assembly 102 and tail rotor assembly 104. Although a particular helicopter configuration is illustrated and described in disclosed embodiments, other configurations and/or machines, such as high speed compound rotary-wing aircraft with supplemental translational thrust systems, dual contra-rotating, coaxial rotor system aircraft, turbo-props, tilt-rotors, tilt-wing aircraft, fixed-wing aircraft, and unmanned aircraft with any of the previous configurations will also benefit from embodiments of the present invention.

Figure 2:
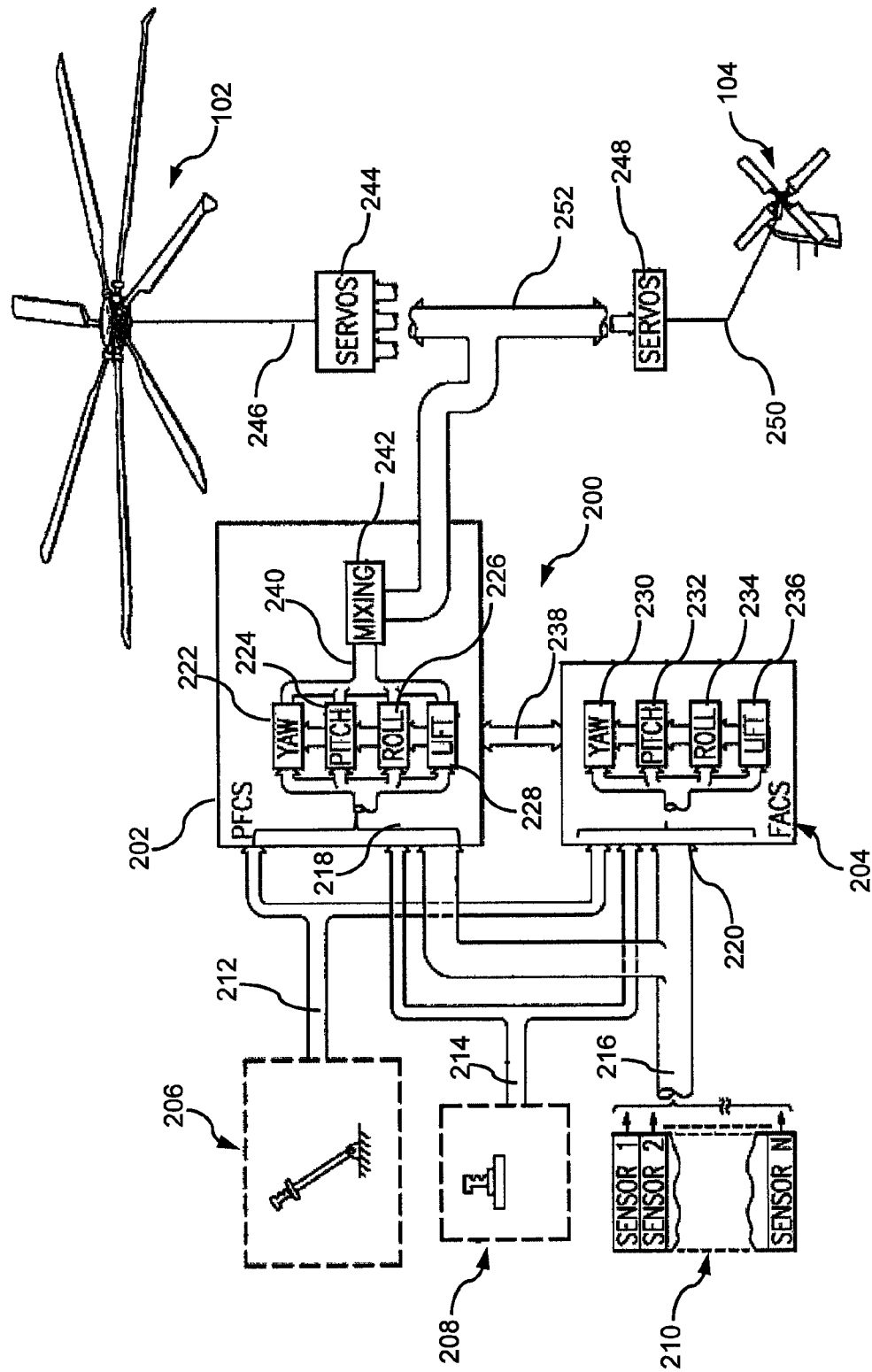
FIG. 2 is a schematic diagram of an exemplary flight control system.

FIG. 2 illustrates a schematic block diagram of the a fly-by-wire flight control system 200 including a model following control system which shapes the pilot's controller and displacement commands within an operational envelope in order to produce the desired aircraft response according to an exemplary embodiment. Particularly, the system 200 estimates a sideslip angle and limits the amount of yaw rate available to a pilot as a function of the remaining sideslip envelope and includes a Primary Flight Control System (PFCS) 22 and an Automatic Flight Augmentation and Cuing System (FACS) 204.

The PFCS 202 is the flight critical portion of the flight control system, while the FACS 204 is the mission critical portion. The FACS 204 augments the performance of the PFCS 202. The PFCS 202 and FACS 204 execute explicit model following control laws to provide both control and stability augmentation. In this control law architecture, pilot commands are shaped directly into desired aircraft responses. These desired commands are then passed through an inverse aircraft model to obtain the control commands required to produce the desired response. The difference between the desired command and the aircraft response is also fed back to drive these errors towards zero, thus improving the model following performance.

The PFCS 202 and FACS 204 each receive the force output command signals of a collective controller 206 on line 212, a cyclic controller 208 on line 214, and the aircraft's sensed parameter signals from sensors 210, on lines 216. The collective controller 206 and the cyclic controller 208 may take various forms including sidearm controllers, a yaw pedal system or other such flight controllers. The pilot command signals on lines 212, 214 and the sensed parameter signals on lines 216 are shown consolidated within trunk lines 218 and 220 in the PFCS 202 and FACS 204, respectively.

The PFCS 202 and FACS 204 may each contain separate control channel logic laws for controlling the yaw, pitch, roll and lift axes of the aircraft within the operational flight envelope. The logic is included in the PFCS 202 and FACS 204 control modules (schematically represented by blocks 222-228 for the PFCS 202 and blocks 230-236 for the FACS 204). The sensed parameter signals from aircraft sensors 210, on lines 216, provide the PFCS 202 and FACS 204 with the aircraft's angular rate and attitude response to the rotor command signals. In an embodiment, the FACS 204 utilizes the sideslip envelope protection algorithm for estimating the sideslip angle and uses a sideslip envelope model stored in memory for determining the maximum yaw rate limits. The FACS logic utilizes the sideslip envelope to limit the yaw rate available to the pilot for producing a desired response without exceeding the sideslip envelope. The PFCS logic provides rotor command signals and the FACS logic provides conditioning and/or trimming of the PFCS four axis logic functions based on the sideslip envelope. In other embodiments, the pilot may override the yaw rate limits by limiting the minimum allowable yaw rate to be small but above zero such as, in one non-limiting example, about 3 degrees per second. The PFCS and FACS logic modules interconnect through bus 238 to provide rotor command signals on output lines 240 to a mixing function 242, which communicates commands on lines 252 for the displacement of servos 244 and linkages 246 to control the tip path plane of the main rotor 102. A mixed command signal is also provided on line 250 to the tail rotor servos 248 which control the thrust of the tail rotor 104 through linkages 250.

Figure 3:
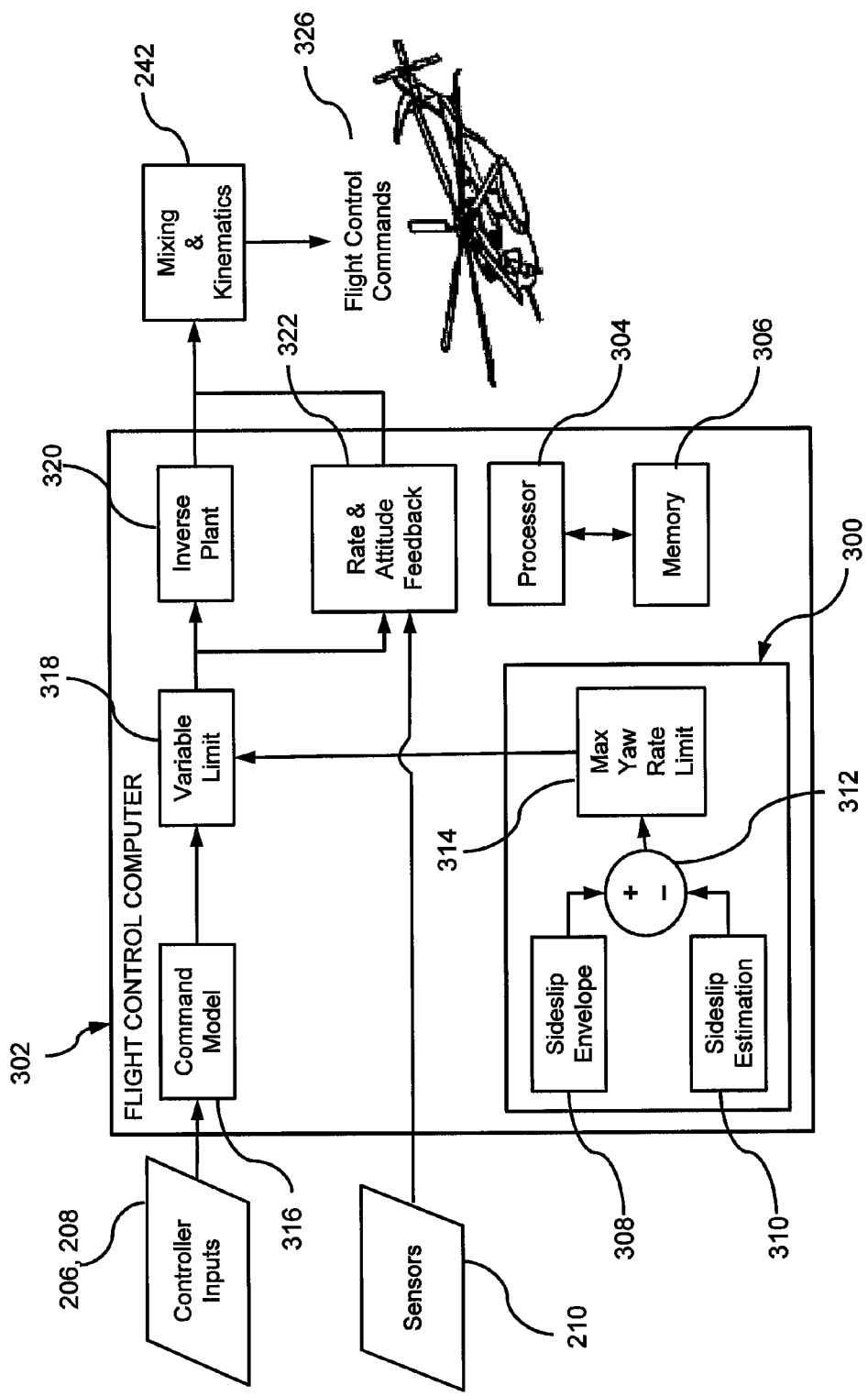
FIG. 3 illustrates a schematic block diagram of an algorithm used for estimating the sideslip angle and for limiting the yaw rate response according to an embodiment of the invention.

FIG. 3 illustrates a schematic block diagram of a sideslip limit protection algorithm 60 implemented by the FACS 204 (FIG. 2) that communicates with, in an exemplary embodiment, the model following control law system of the PFCS 202 (FIG. 2) for estimating the sideslip angle and for limiting the yaw rate response according to an embodiment of the invention. For ease of illustration and understanding, the functional block diagram in FIG. 3 illustrates the sideslip limit protection algorithm 300 stored in memory 306 on flight control computer system 302 and executed by a microprocessor 304 (FIG. 2) for implementing the algorithm 300 intended to provide sideslip limits by limiting the amount of yaw rate available to the pilot along the yaw axis as a function of the sideslip envelope. The microprocessor 304 of computer system 302 can be any type of processor (CPU), including a general purpose processor, a digital signal processor, a microcontroller, an application specific integrated circuit, a field programmable gate array, or the like. Also, in embodiments, memory 306 may include random access memory (RAM), read only memory (ROM), or other electronic, optical, magnetic, or any other computer readable medium onto which is stored the data and control algorithms described below.

Initially, the microprocessor 304 initiates the sideslip protection algorithm 300 by utilizing a sideslip envelope 308 that is defined for the structural limits of a particular airframe of the aircraft. The sideslip envelope 308 includes a table with values of sideslip angles that defines areas where operational conditions may be maintained for a particular airframe and defines the typical structural limits of the aircraft. In an example, the sideslip envelope 308 values defines angles for the yaw rotation or sideslip for the yaw axis that maintain a desired aircraft response such as, for example, a 100% rotor speed when the flight control commands are applied to the main rotor system 102. Also, a sideslip estimation 310 is performed by considering at least one of several aircraft operating parameters such as, in some non-limiting examples, lateral acceleration, aircraft attitude, and aircraft's angular rate in order to estimate the aircrafts sideslip angle.

The sideslip envelope 308 and the estimate of the aircraft's sideslip angle are then compared at comparator 312 to determine which is greater and an output value is sent to the maximum yaw rate limit calculator 314. The output of the comparator 312 is a comparison of the values of the sideslip angle with the stored values that define the operational flight characteristics. The maximum yaw rate limit calculator 314 determines the maximum yaw rate limits based on a predetermined formula stored in memory 306 and outputs the value to the variable limit adjuster 318. The variable limit adjuster 318 determines the yaw rate available that the pilot can command through controllers 206, 208 and/or pedal inputs by scaling max yaw rate available as a factor of the remaining sideslip envelope 308 in order to generate a scaled yaw rate. The scaled yaw rate is a variable yaw rate that is adjusted for the sideslip envelope limits remaining. In an embodiment, the variable limit adjuster 318 may be a look-up table that indexes the max yaw rate available against the sideslip envelope 308 that is available.

To illustrate, take an example where the aircraft is at the boundary of the sideslip envelope 308 in which case the algorithm 300 will adjust the yaw rate available as the scaled yaw rate at the pedal inputs by implementing a pedal stop and determine that the scaled yaw rate available may be very small or non-existent. By depressing the pedal and engaging a pedal stop, the algorithm 300 prevents the sideslip envelope 308 from being exceeded by the pilot. In another embodiment, the algorithm 300 may provide the pilot to override the yaw rate limits by limiting the minimum allowable yaw rate to be small such as, in one example, 3 degrees per second. It is to be appreciated that the system 302 provides implicit tactile cueing of the sideslip limit by scaling pedal inputs so that applying maximum pedal deflection and contacting a pedal stop corresponds to the maximum sideslip angle allowable in the FACS 204.

Also, the computer system 302 utilizes the output of the command model 316, the sideslip envelope protection algorithm 300 and the output of the inverse plant 320 (through attitude feedback 322 and the mixing and kinematics 242) of the computer system 302 to estimate power required to maintain a reference rotor speed (such as, for example, 100% rotor speed), when the flight control commands are applied to the main rotor system 102 (FIG. 2). Due to the nature of any model-following control system, there is an inherent delay from the time that the model following control law system of the PFCS 202 (FIG. 2) computes the desired yaw rate, through the time that the commands suitable for creating the desired yaw rates are applied to the flight controls commands 326, and ending at the resultant actual aircraft response. The algorithm 300 utilizes this delay to determine the expected power required for, in one example, control channel logic law in the yaw axis of the aircraft. The algorithm 300 is applicable to all rotary-wing aircraft and unmanned aircraft that utilize fly-by-wire technology. In addition, the algorithm 300 provides for "care-free" maneuvering in the yaw axis of the aircraft by shaping the response to pedal inputs so as not to exceed the sideslip limits in any portion of the flight regime.

The technical effects and benefits of exemplary embodiments include an algorithm for scaling pilot commands based on the sideslip envelope. In an embodiment, the system includes estimating the sideslip angle and comparing it to the sideslip envelope in order to limit the maximum yaw rate available to the pilot through pedal deflection.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while various embodiment of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for providing sideslip envelope protection to an aircraft, comprising:
   obtaining, with a processor, sideslip values from a sideslip envelope, the sideslip envelope defines structural limits of operation of the aircraft along an axis;
   estimating, with the processor, a sideslip angle along the axis from at least one operating parameter of the aircraft;
   comparing, with the processor, the sideslip angle with the sideslip value and generating an output value;
   determining, with the processor, a maximum yaw rate from the output value; and
   scaling, with the processor, the maximum yaw rate to generate a scaled yaw rate; wherein the scaled yaw rate corresponds to a variable yaw rate available to the aircraft that is adjusted for the sideslip envelope that remains from the estimated sideslip angle.

2. The method of claim 1, wherein the scaled yaw rate is a function of the sideslip envelope and the maximum yaw rate.

3. The method of claim 1, wherein scaling the maximum yaw rate is performed by a look-up table indexing the maximum yaw rate with the sideslip envelope.

4. The method of claim 1, wherein the operating conditions includes lateral acceleration, attitude, and angular rate.

5. The method of claim 1, further comprising scaling a pedal input as a function of the scaled yaw rate.

6. The method of claim 1, wherein the sideslip envelope corresponds to a maximum pedal displacement.

7. The method of claim 1, further comprising receiving the at least one operating condition from one or more sensors.

8. The method of claim 1, wherein the axis corresponds to the yaw.

9. A system for providing sideslip envelope protection, comprising:
   a processor for obtaining sideslip values of a sideslip envelope indicative of structural limits of operation of the aircraft along an axis and for estimating a sideslip angle along the axis from at least one of the operating conditions; and
   a comparer for comparing the sideslip angle with the sideslip envelope to generate an output value;
   wherein the processor determines a maximum yaw rate from the output value; and
   wherein the processor scales the maximum yaw rate to generate a scaled yaw rate;
   wherein the scaled yaw rate corresponds to a variable yaw rate available to the aircraft, the variable yaw rate being adjusted for the sideslip envelope that remains from the estimated sideslip angle.

10. The system of claim 9, wherein the scaled yaw rate is a function of the sideslip envelope and the maximum yaw rate.

11. The system of claim 9, wherein scaling the maximum yaw rate is performed by a look-up table indexing the maximum yaw rate with the sideslip envelope.

12. The system of claim 9, wherein the operating conditions includes lateral acceleration, attitude, and angular rate.

13. The system of claim 9, wherein a controller scales a pedal input as a function of the scaled yaw rate.

14. The system of claim 9, wherein the sideslip envelope corresponds to a maximum pedal displacement.

15. The system of claim 9, wherein the scaled yaw rate corresponds to an available sideslip envelope.

16. The system of claim 9, wherein the axis corresponds to the yaw.

* * * * *